United States Patent [19]
Arnold et al.

[11] 3,784,017
[45] Jan. 8, 1974

[54] LIQUID-SOLIDS SEPARATOR
[75] Inventors: Orlan M. Arnold, Grosse Pointe Park, Mich.; Carlo A. Vancini, Stamford, Conn.
[73] Assignee: Peabody Engineering Corporation, New York, N.Y.
[22] Filed: Dec. 13, 1971
[21] Appl. No.: 207,048

[52] U.S. Cl................. 210/354, 210/393, 210/396, 210/402
[51] Int. Cl............................................. B01d 33/06
[58] Field of Search................... 210/354, 359, 391, 210/393, 396, 402, 107, 108

[56] References Cited
UNITED STATES PATENTS

| 870,138 | 11/1907 | Stump et al. | 210/393 |
| 1,151,999 | 8/1915 | Bird | 210/393 |
| 1,914,742 | 6/1933 | Hillier | 210/393 X |
| 2,268,065 | 12/1941 | Smith | 210/354 |
| 2,812,065 | 11/1957 | Wilson | 210/393 |
| 3,206,030 | 9/1965 | Estabrook | 210/391 X |
| 3,332,553 | 7/1967 | Casson | 210/107 X |
| 3,647,071 | 3/1972 | Lamort | 210/108 |

*Primary Examiner*—Samih Zaharna
*Assistant Examiner*—Ivars Cintins
*Attorney*—Nathaniel L. Leek

[57] ABSTRACT

A liquid-solids separator comprising a rotating drum having a perforated peripheral surface immersed in the liquid. Liquid is drawn in through the peripheral screen and discharged through an axial pipe. A reverse flush is provided by an elongated liquid jet directed against the interior of the perforated wall and enmeshed particles are removed by an outside scraper blade or by a rotating outer brush. The device is particularly adapted for use in the reservoir of a gas washing unit for removing particulate material from the wash liquid.

16 Claims, 11 Drawing Figures

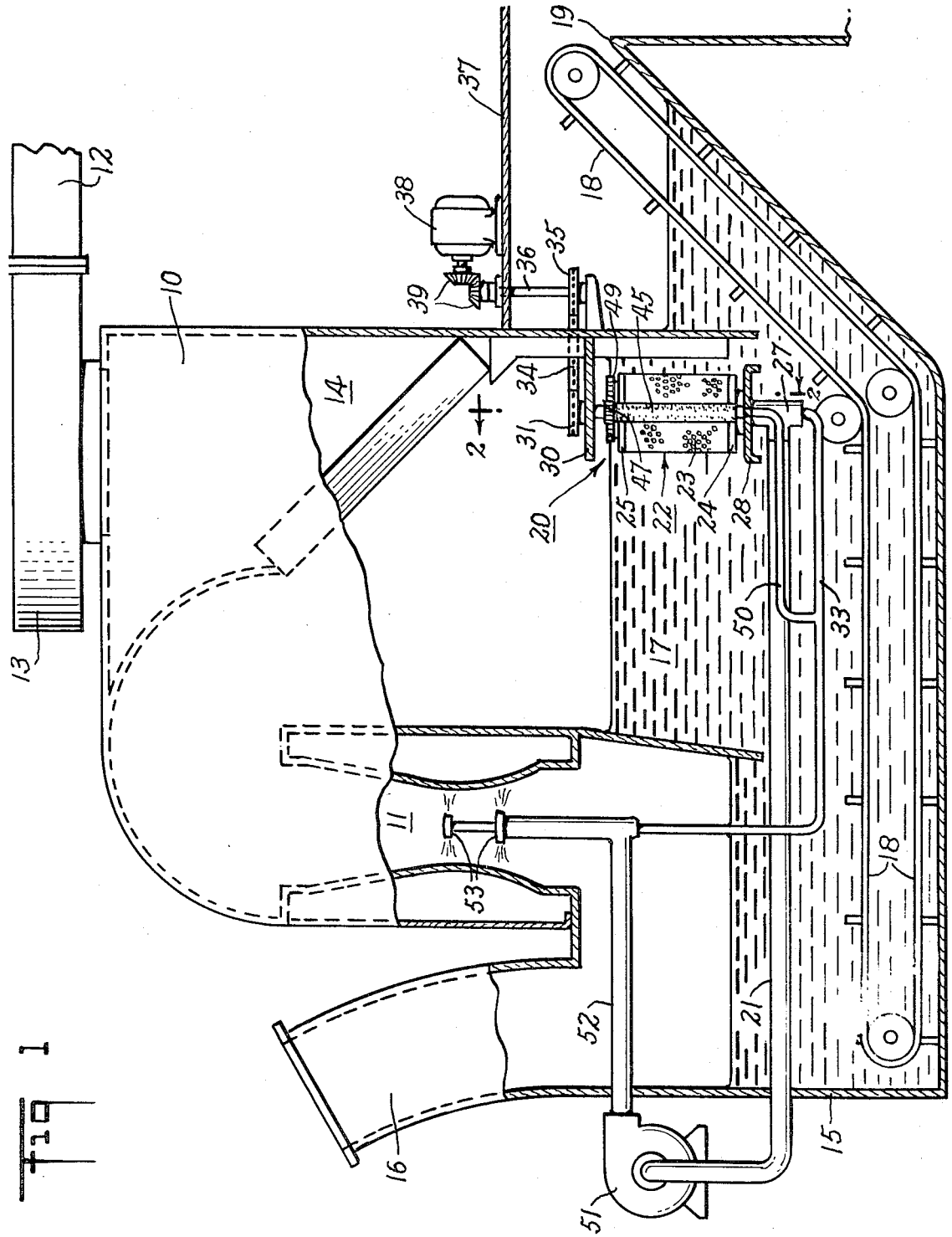

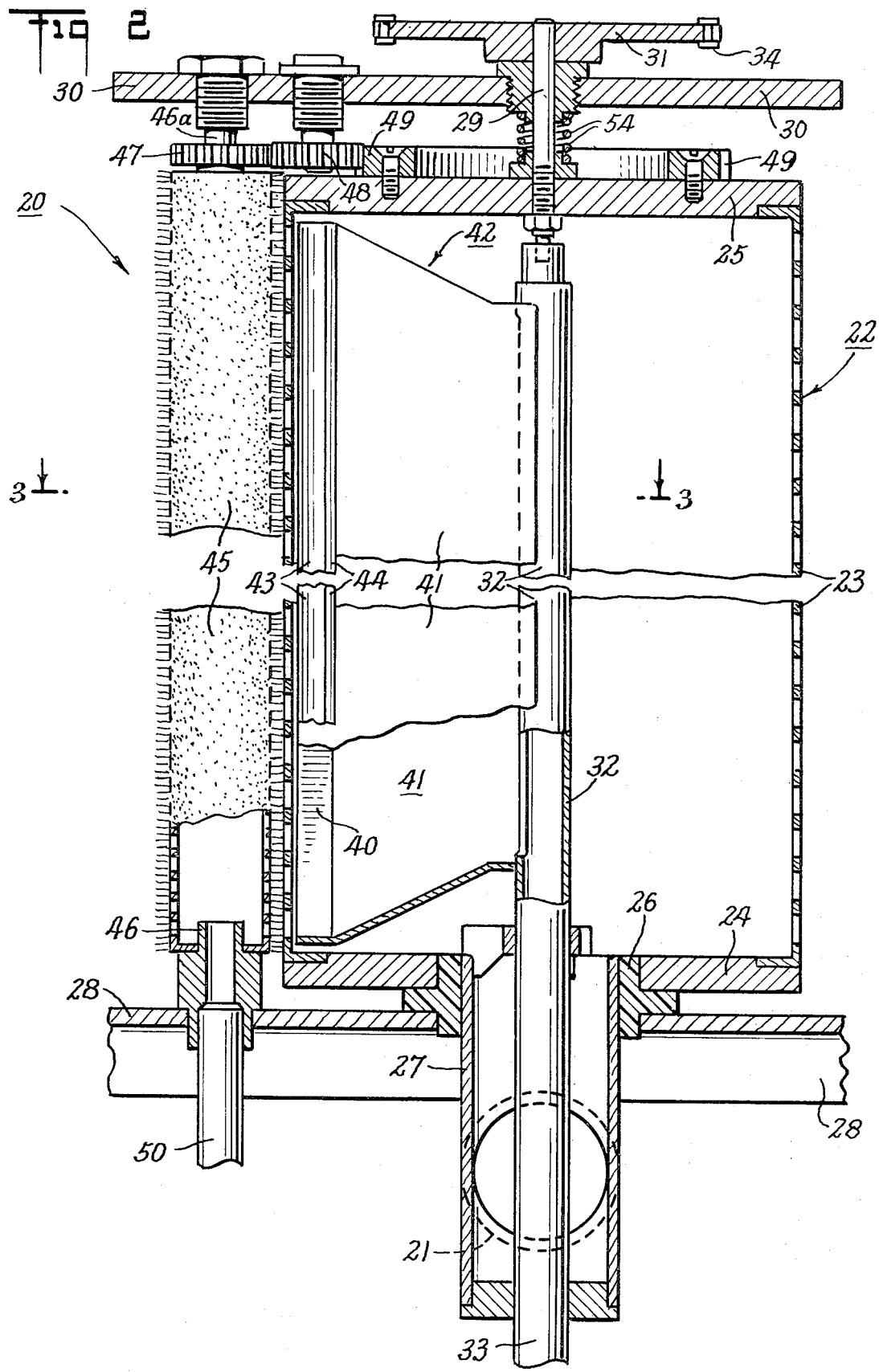

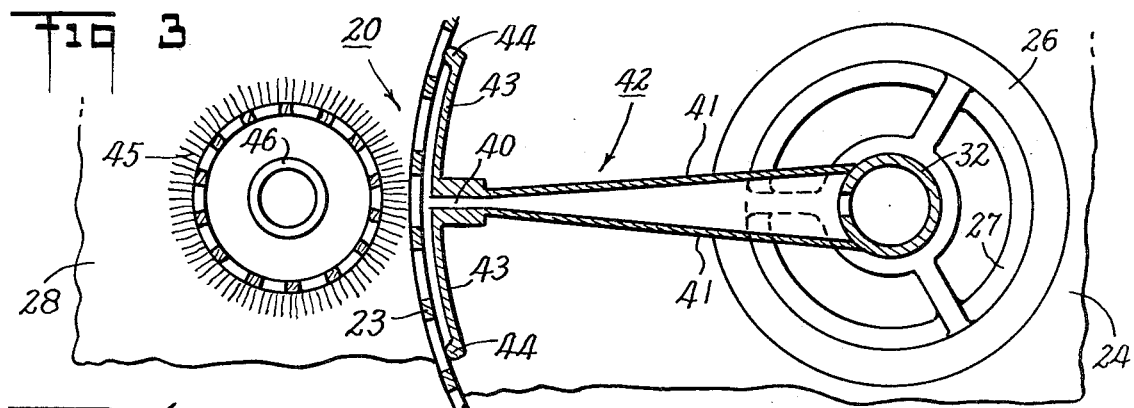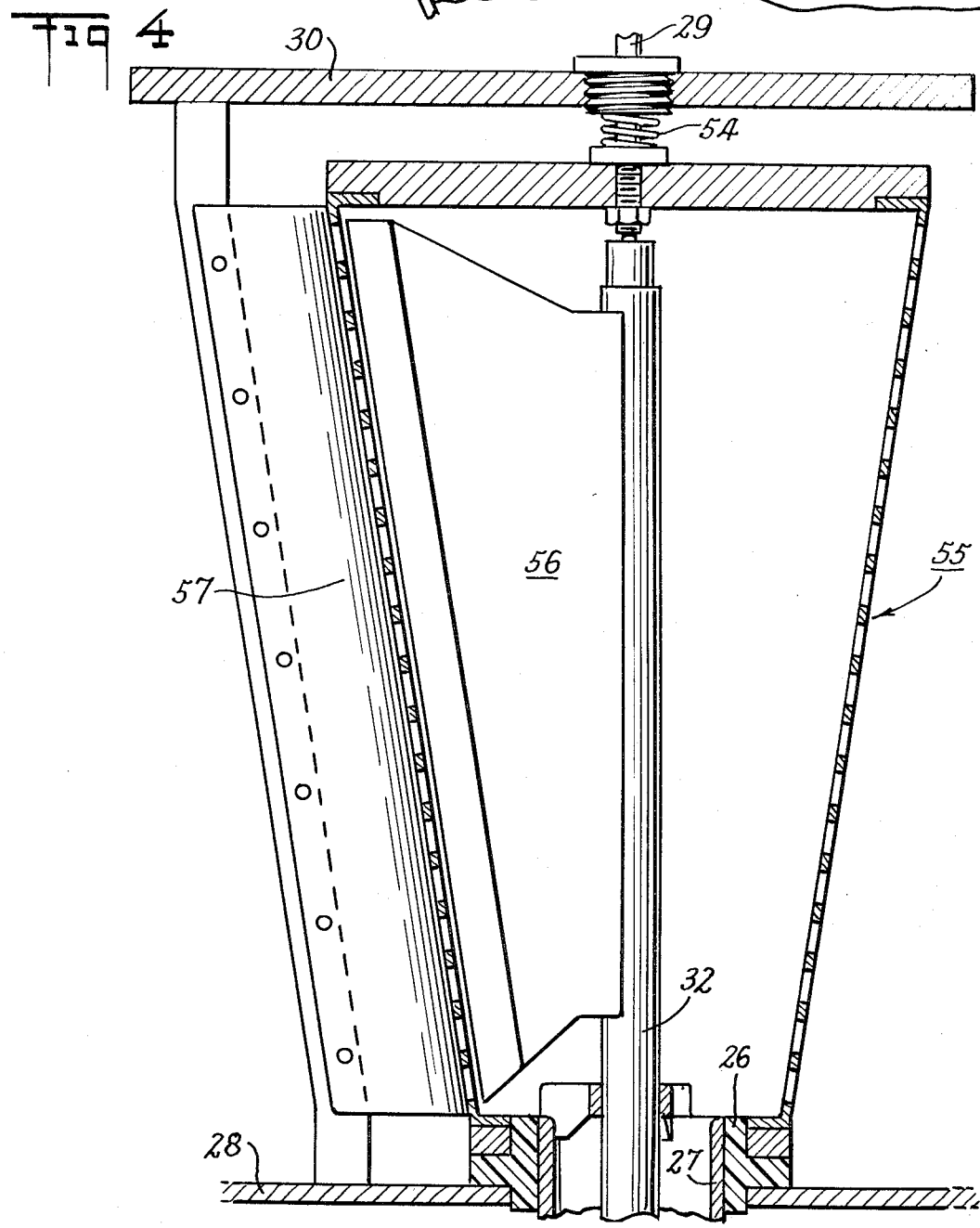

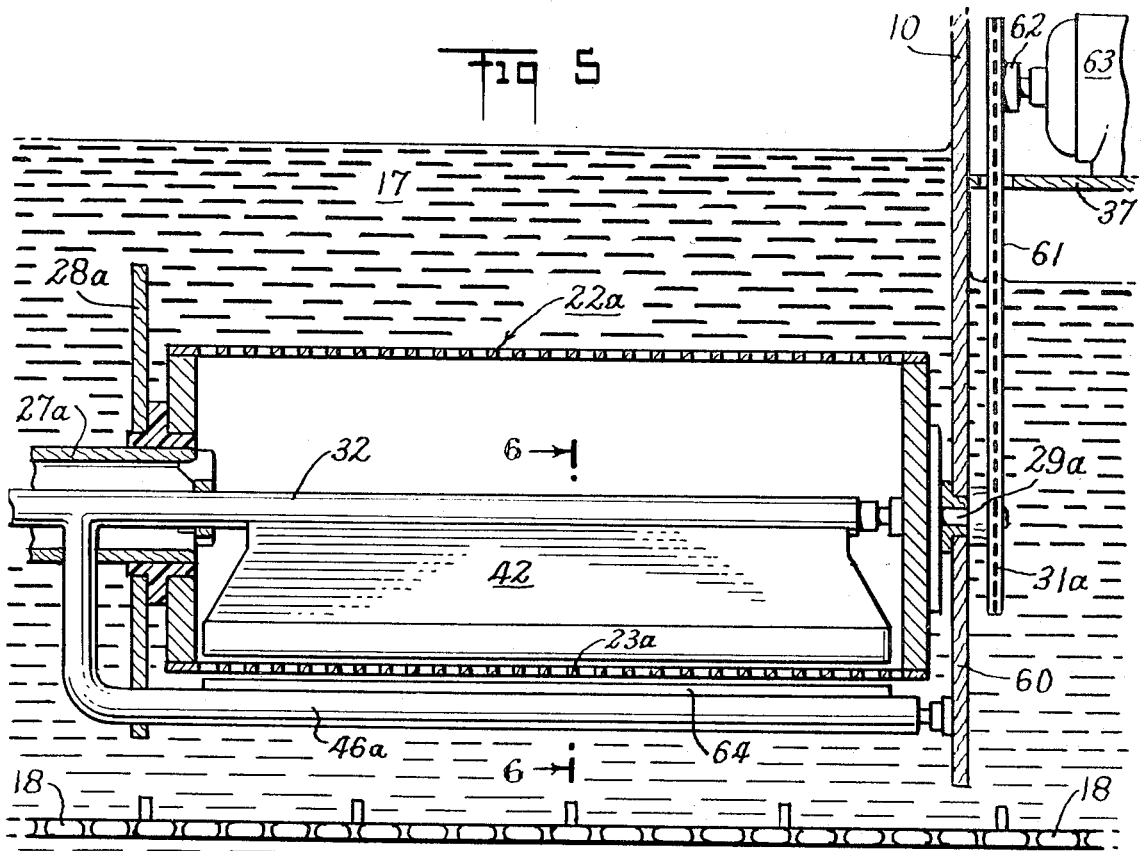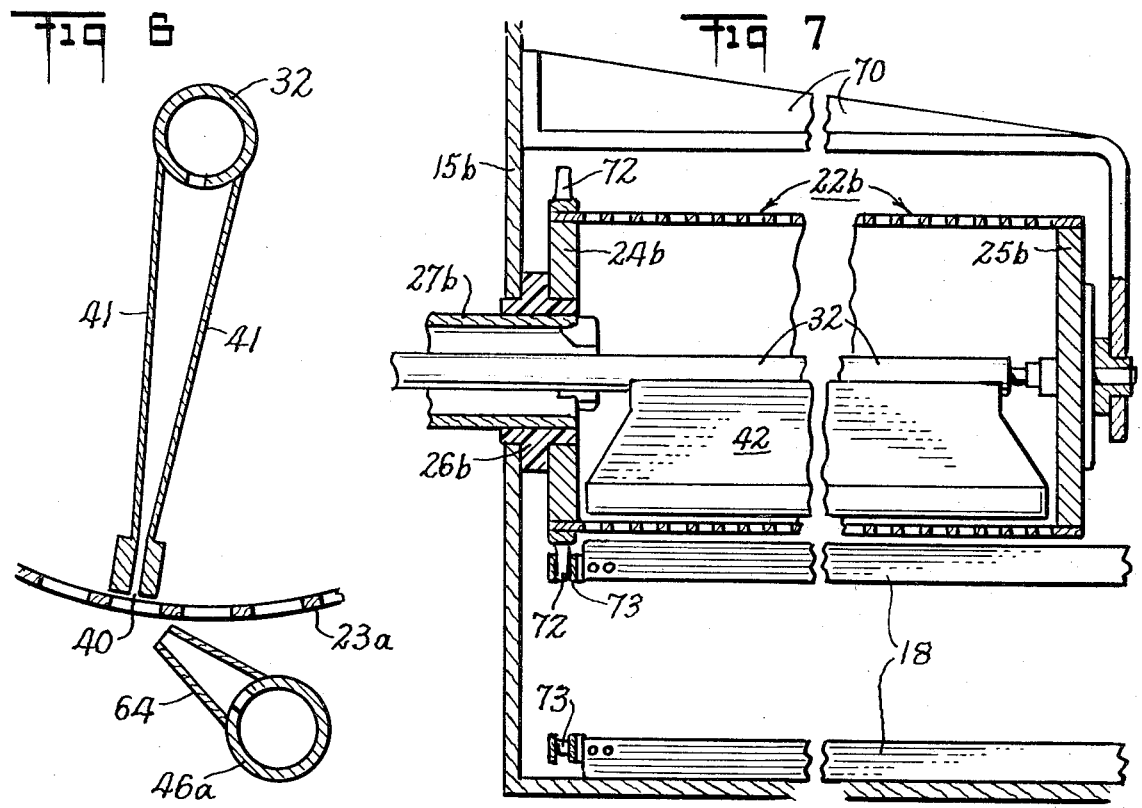

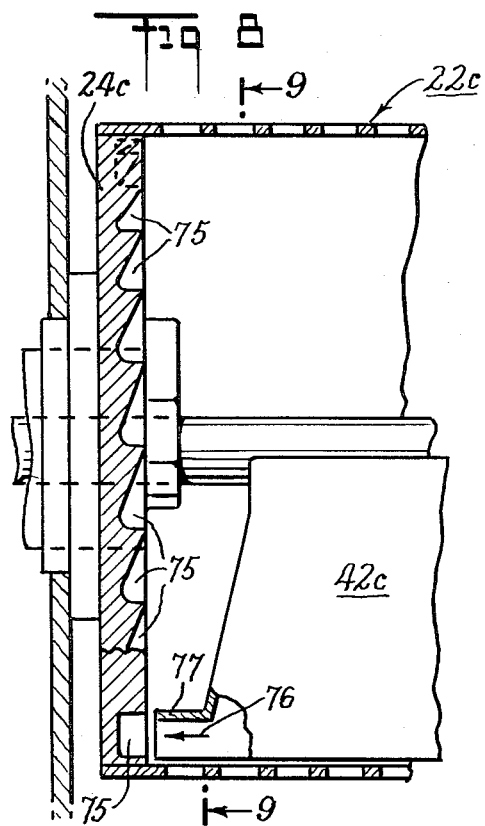
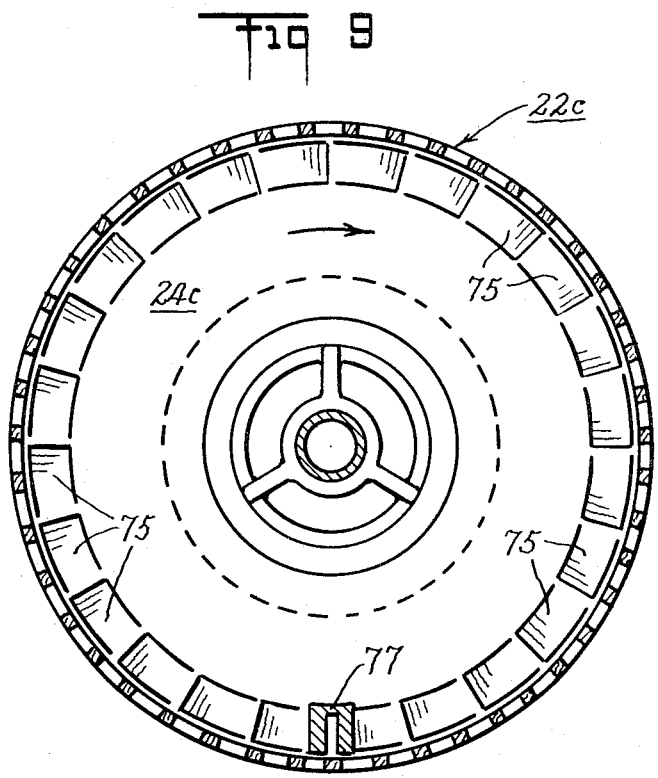
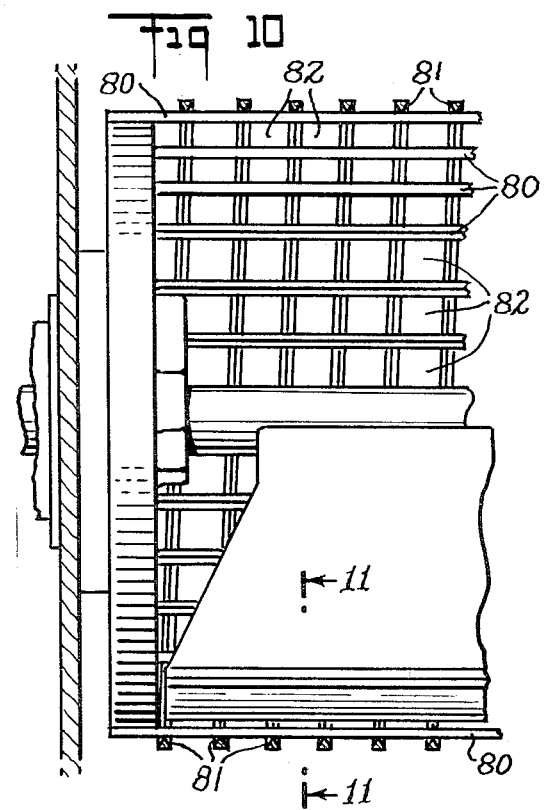
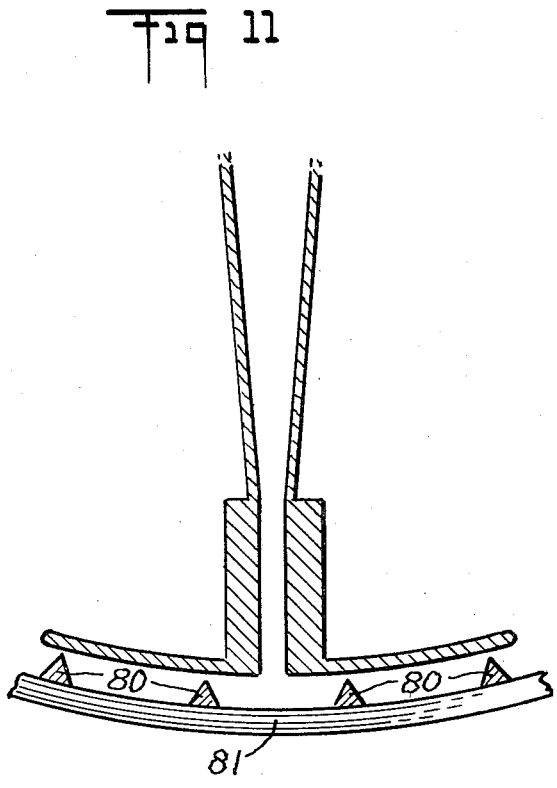

LIQUID-SOLIDS SEPARATOR

This invention relates to a liquid-solids separator or solids concentrator for use in separating entrained particulate matter from liquids and more particularly to apparatus for separating suspended particles from the wash liquid in a gas washing unit.

An object is to provide a separator of the above type having improved operating characteristics.

Another object is to improve the efficiency of such a concentrator.

Another object is to provide a device of the above type which is adapted to remove particulate material from liquids which are to be recycled to a pump and which might be deleterious to the pump.

Another object is to provide a concentrator of the above type which is suited for commercial production and use and which requires a minimum of maintenance.

Various other objects and advantages will be apparent as the nature of the invention is more fully disclosed.

The nature of the invention will be better understood from the following description, taken in connection with the accompanying drawings in which certain specific embodiments have been set forth for purposes of illustration.

IN THE DRAWINGS

FIG. 1 is an elevation of a gas washing apparatus with parts broken away to show the separator of the present invention embodied therein;

FIG. 2 is a partial vertical section taken on the line 2—2 of FIG. 1;

FIG. 3 is an enlarged partial section taken on the line 3—3 of FIG. 2;

FIG. 4 is a partial vertical section similar to FIG. 2 illustrating the invention embodied in a conical drum;

FIG. 5 is a vertical axial section through a separator drum mounted to rotate about a horizontal axis extending longitudinally of a sludge removal conveyor;

FIG. 6 is an enlarged partial section similar to FIG. 3 taken on the line 6—6 of FIG. 5;

FIG. 7 is a vertical section similar to FIG. 5 illustrating the use of a separator drum extending transversely of the conveyor; and FIG. 8 is a partial sectional view showing the separator drum driven by a hydraulic motor;

FIG. 9 is a sectional view taken on the line 9—9 of FIG. 8.

FIG. 10 is a partial sectional view of a separator drum having a peripheral surface formed by longitudinal bars and a helical wire; and FIG. 11 is an enlarged detail section taken on the line 11—11 of FIG. 10.

Referring to the drawing more in detail, the invention is shown in FIGS. 1 to 3 as embodied in a gas washing apparatus including a vessel 10 containing a washing zone 11 and a drying zone 14 of any known type in which entrained droplets or suspended matter is removed from the gas stream, from which the washed and dried gases are fed into a discharge duct 12 by a suitable blower 13. The vessel 10 is mounted above a reservoir 15 into which the wash liquid containing the removed particulate material is collected. The incoming gases are introduced above the level of the collected liquid in the reservoir 15 by means of an inlet duct 16.

The solid components tend to settle out from the liquid 17 in the reservoir 15 and to form a sludge which is removed by any suitable means such as a conveyor 18 by which they are discharged over a discharge lip 19 to a collector means.

In order to recirculate the wash liquid from the reservoir 15 to the washing zone 11 it is necessary to remove particulate material which would injure the recirculating pump or other apparatus with which they may come in contact. For this purpose the present invention provides a separator unit 20 which is immersed in the liquid 17 in the reservoir 15 and from which the liquid is recirculated by means of a pipe 21, pump 51 and pipe 52 to spray nozzles or other washing elements in the washing zone 11.

The separator unit 20 comprises a rotating drum 22 having a perforated peripheral wall 23, a bottom closure 24 and a top closure 25. The bottom closure 24 is mounted for rotation in a thrust bearing 26 around a pipe tee 27 communicating with the pipe 21 and mounted in a support bar 28 which extends across the reservoir 15. The pipe tee 27 communicates with the interior of the drum 22 to receive the liquid therefrom after the particulate matter has been removed by the side walls 23 of the drum.

The top closure member 25 carries a shaft 29 which extends through and is journalled in a support plate 30 attached to the walls of the reservoir 15. The shaft 29 carries a sprocket 31 and its lower end projects into the end of a fixed pipe 32 which extends through the pipe tee 27 with a clearance therearound for the passage of liquid into the pipe 21 and is connected to a supply pipe 33 by which flush liquid is supplied to the interior of the drum 22. The drum 22 is held against thrust bearing 26 by a spring 54 around shaft 29 and engaging the upper support plate 30. The sprocket 31 is driven by a drive chain 34 from a drive sprocket 35 carried on a drive shaft 36 which extends through the cover 37 of the reservoir 15 and is driven by a motor 38 through suitable gears 39.

The internal pipe 32 is formed with an axial slot 40 on opposite sides of which a pair of vanes 41 are mounted. These vanes 41 extend from the pipe 32 to the inner surface of the peripheral wall 23 of the drum 22 and are spaced to form an elongated nozzle 42 for directing reverse flow flush liquid against the wall 23 to remove entrained matter from the screen. The vanes 41 are provided at their outer ends with flared wings 43 having raised ribs 44 on their outer surface which have a running contact with the inner surface of the screen 23 and which serve to form a confined zone for the flush liquid by which it is forced through the screen perforations for purging purposes.

For cleaning the outer surface of the screen wall 23, a rotating brush 45 is shown mounted at its lower end on a hollow shaft 46 which is journalled in support member 28. The upper end of brush 45 carries a spur gear 47, and a shaft 46a journalled in upper support plate 30. The spur gear 47 meshes with an idler gear 48 mounted on the plate 30 which meshes with a ring gear 49 carried by the top closure 25. The arrangement is such that the brush 45 is rotated in the opposite direction from the drum 22 so as to wipe the surface and to remove entrained particles. A flush liquid may be supplied to the hollow shaft 46 by a pipe 50 connected to the pipe 33.

In operation the liquid is drawn from the reservoir through the screen openings in the wall 23 into the drum 22 and thence through pipe 21 to pump 51 and is supplied to the washing zone 11 in the vessel 10. The screen openings are of a size to remove particles which would injure the pump or clog the apparatus. The screen surface is constantly cleaned by the liquid jet supplied by the vanes 41 within the drum 22 and by the rotating brush 45 on the outside of the screen surface. Additional flush liquid is supplied to the hollow shaft 46 of the brush 45 if desired for assisting the mechanical action of the brush 45 in removing entrained particles. Liquid under pressure for the jet nozzle 42 and brush 45 may be supplied from the pump 51. The drum 22 is rotated at a suitable speed by the motor 38 for effecting efficient operation. The removed particulate material is dropped from the drum 22 into the liquid in the reservoir and settles into the sludge at the bottom. The solids are thus concentrated by the separator as they are removed from the recirculated liquid.

It is obvious that additional brushes may be used if necessary or a fixed scraper blade may be used according to the nature of the material being processed.

In the embodiment of FIG. 4 the drum 55 is conical in shape and the internal vanes 56 are correspondingly shaped. Also the rotating brush has been replaced by a stationary scraper blade 57. The other parts are similar to those of FIGS. 1 to 3 and the operation is similar.

The advantage of this form is that the particulate material falls directly from the sloping surface of the screen to the bottom of the reservoir. The scraper blade is shown for purposes of illustration only. A stationary or a rotating brush may be used if desired for cleaning the outer surface of the screen.

In the embodiment of FIGS. 5 and 6 the drum 22a is shown as mounted horizontally with its axis of rotation parallel to the direction of feed of the conveyor 18. In this embodiment the drive shaft 29a extends through and is mounted in bearings in the submerged wall 60 of the vessel 10. The pipe tee 27a is mounted in a cross bar 28a as in FIG. 1. The drive sprocket 31a on the shaft 29a is driven by a chain 61 extending through the cover 37 of the reservoir and is driven by sprocket 62 on the shaft of the motor 63.

The hollow shaft 46a in FIG. 5 carries an elongated jet 64 which is directed against the outer surface of the drum screen 23a for cleaning the same. It is to be understood that this outer jet 64 may be used with the drums in any of the various embodiments.

In the embodiment of FIG. 7 the drum 22b and the associated parts are generally similar to those above described except that the axis of rotation of the drum 22b extends transversely of the direction of advance of the conveyor 18. In this embodiment the pipe tee 27b is carried in bearing element 26b which is mounted in the wall 15b of the reservoir. The end closure 24b of the drum 22b is journalled in the bearing element 26b. The end closure 25b is journalled in a bracket 70 which is carried on the wall 15b. The end closure 24b carries a ring gear 72 which meshes with the drive chain 73 of the sludge conveyor 18. The drum 22b is thus driven by the conveyor chain with the elimination of a second drive motor. The construction and operation are otherwise similar to that above described and the corresponding parts have been given the same reference numbers with the suffix b.

In the embodiment of FIGS. 8 and 9 the drum 22c and the corresponding parts are similar to those of FIGS. 5 and 6 and have been given similar reference numbers with the suffix c. In this embodiment, however, the drum 22c is driven by a hydraulic motor composed of a series of vanes 75 carried on the inner surface of the closure member 24c on which a jet 76 from a nozzle 77 impinges. The nozzle 77 is formed by an extension of vanes 42c. The rate of rotation may be controlled by varying the pressure of the jet or by other known means.

FIGS. 10 and 11 illustrate a modified construction for the wall 23 of the drum. In this form the peripheral wall is composed of a series of parallel bars 80 of triangular cross section which are disposed around the periphery of the drum and secured to the end closure means in any suitable manner. A wire 81 which may also be of triangular cross section is wrapped helically around the spaced bars 80 to form the outer surface of the drum. The bars 80 and the wires 81 are spaced to provide openings 82 of the desired size around the entire periphery of the drum.

The points of the triangular sections of the bars 80 are disposed toward the inside of the drum so that the openings 82 flare outwardly toward the inside (FIG. 11). The points of the triangular section of the helical wire 81 may be extended inwardly as shown in FIG. 10. This prevents separated particles from becoming wedged in the openings and facilitates the cleaning of the screen surface. Obviously this type of drum may be used in any of the embodiments of the invention.

It is to be understood that the various mechanical features herein described are illustrative only and may be rearranged or combined in various ways as will be apparent to a person skilled in the art. The invention is only to be limited by the scope of the following claims.

What is claimed is:

1. A liquid-solids separator adapted to separate solids from liquid while immersed in said liquid comprising a drum having a perforate peripheral wall and end closure members adapted to be immersed in the liquid, a discharge pipe communicating with said drum through one of said end closure members for discharging liquid which has passed inwardly through said perforate wall, means for rotating said drum about said discharge pipe, a supply pipe within said drum concentric with said discharge pipe and extending axially into said drum having an elongated discharge opening and vanes disposed on opposite sides of said opening and having wing members extending outwardly therefrom with their discharge edges adjacent said perforate wall and spaced apart to form an elongated fixed liquid jet within said drum adapted to direct a jet of liquid against said wall, a perforate brush mounted on a hollow shaft for rotation outside of said drum with its periphery contacting the outer surface of said perforate wall and means to supply wash liquid to said shaft, and a sludge conveyor in said liquid for removing solids therefrom.

2. Apparatus as set forth in claim 1 in which said last mentioned end closure member is journalled for rotation about said discharge pipe.

3. Apparatus as set forth in claim 1 in which parallel ribs are formed on the contacting surfaces of said wings for effecting a closure with said perforate wall as the drum rotates.

4. Apparatus as set forth in claim 1 in which a drive shaft is carried by the other of said end closure members and projects inwardly to rotate in said inlet pipe.

5. Apparatus as set forth in claim 1 in which gear means are provided for driving said brush from said drum.

6. Apparatus as set forth in claim 1 in which a scraper blade is mounted to contact the outer surface of said perforate wall for removing trapped particles therefrom.

7. Apparatus as set forth in claim 1 in which an outer jet is provided to wash the outer surface of said perforate wall for cleaning purposes.

8. Apparatus as set forth in claim 1 in which said drum is immersed in the liquid in a reservoir and is mounted to turn about a vertical axis.

9. Apparatus as set forth in claim 1 in which said drum is immersed in the liquid in a liquid reservoir and is mounted to turn about a horizontal axis.

10. Apparatus as set forth in claim 9 in which said horizontal axis of said drum extends parallel to the movement of said conveyor.

11. Apparatus as set forth in claim 10 in which said horizontal axis of said drum extends across the path of movement of said conveyor and said drum is mounted to be driven by said conveyor.

12. Apparatus as set forth in claim 1 in which hydraulic drive means is provided to drive said drum.

13. Apparatus as set forth in claim 1 in which said drum is conical in form with a tapered peripheral surface.

14. Apparatus as set forth in claim 1 in which the peripheral surface of said drum is formed by a plurality of spaced, parallel bars extending axially of said drum around the periphery thereof and by a wire wound helically around said bars to form an open mesh.

15. Apparatus as set forth in claim 14 in which said bars are triangular in cross-section with the points of the triangle extending inwardly of said drum.

16. Apparatus as set forth in claim 15 in which said helical wire is triangular in cross-section with the points of said triangle extending inwardly.

* * * * *